United States Patent
Sahagun et al.

(10) Patent No.: US 10,643,361 B2
(45) Date of Patent: May 5, 2020

(54) IMAGE HANDLING TO SELECT A SUBJECT OF AN IMAGE TO DISPLAY AND CONCEAL A REMAINDER OF THE IMAGE

(71) Applicant: KYOCERA Document Solutions Inc., Osaka (JP)

(72) Inventors: Allan Sahagun, Oakland, CA (US); Christian Holmes, Oakland, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 50 days.

(21) Appl. No.: 15/908,717

(22) Filed: Feb. 28, 2018

(65) Prior Publication Data

US 2019/0266768 A1 Aug. 29, 2019

(51) Int. Cl.
  *G06T 11/60* (2006.01)
  *G06T 3/40* (2006.01)
(52) U.S. Cl.
  CPC .............. *G06T 11/60* (2013.01); *G06T 3/40* (2013.01); *G06T 2210/22* (2013.01)
(58) Field of Classification Search
  None
  See application file for complete search history.

(56) References Cited

U.S. PATENT DOCUMENTS

| | | | |
|---|---|---|---|
| 7,219,329 B2 | 5/2007 | Meijer | |
| 7,715,656 B2 | 5/2010 | Zhou | |
| 9,329,827 B2 * | 5/2016 | Lavine | G06F 3/14 |
| 9,575,941 B1 | 2/2017 | Westbrook | |
| 9,710,884 B2 | 7/2017 | Parag | |
| 9,767,535 B2 | 9/2017 | Bhatt | |
| 9,792,268 B2 | 10/2017 | Graf | |
| 9,804,881 B2 | 10/2017 | Alessio | |
| 9,824,421 B2 | 11/2017 | Ragozin | |
| 2004/0212822 A1 * | 10/2004 | Schinner | G06F 1/1632 358/1.15 |
| 2007/0140770 A1 * | 6/2007 | Writt | B41J 3/36 400/88 |

(Continued)

OTHER PUBLICATIONS

ScreenSize ("Screen Sizes", http://screensiz.es/, 2017). (Year: 2017).*

(Continued)

*Primary Examiner* — Xin Sheng
(74) *Attorney, Agent, or Firm* — The Webostad Firm, a PC; W. Eric Webostad

(57) ABSTRACT

System and method relating generally to an electronic device are described. In such a method, content is accessed by the electronic device to display the accessed content on at least a portion of a screen. At least one original dimension of the accessed content is determined to exceed at least one threshold dimension corresponding thereto in order to display the accessed content with the at least one original dimension on at least the portion of the screen. Responsive to a determination that the at least one original dimension exceeds the at least one threshold dimension, a subset of the accessed content is obtained with subset dimensions thereof each less than or equal to corresponding display region dimensions including the at least one threshold dimension to display the subset on at least the portion of the screen. The subset is displayed on at least the portion of the screen.

13 Claims, 10 Drawing Sheets

(56) References Cited

U.S. PATENT DOCUMENTS

2010/0328345 A1* 12/2010 Shamir ................ G06T 3/0012
  345/647
2017/0024098 A1*  1/2017 Doherty ............... G06F 3/0485
2018/0150433 A1*  5/2018 Sowden ............... G06F 3/0481
2018/0314878 A1* 11/2018 Lee .................... G06K 9/00228

OTHER PUBLICATIONS

Exiv2 ("The Metadata in JPEG files", https://dev.exiv2.org/projects/exiv2/wiki/The_Metadata_ in_JPEG_files, 2016) (Year: 2016).*

* cited by examiner

IMAGE HANDLING TO SELECT A SUBJECT OF AN IMAGE TO DISPLAY AND CONCEAL A REMAINDER OF THE IMAGE

FIELD

The following description relates to image handling. More particularly, the following description relates to image handling to select a subject of an image to display and conceal a remainder of the image.

BACKGROUND

Content is displayed on display screens of various electronic devices, including mobile phone screens, tablet screens, notebook computer screens, desktop computer screens, projection screens via a projector, and television screens, among other electronic devices. This content may include one or more images, and such content may be displayed together, such as rendered for display on a same webpage, email message, text message, or other viewable content.

For display devices, which may include built-in or external standalone screens, there are various sizes. Moreover, a variety of resolution capabilities may exist among different display devices. The different screen sizes and/or resolutions can impair a readily discernable state of some images, whether picture or video images. For example, currently in dynamic web views (e.g., responsive design), when a webpage is resized, one or more images of such webpage are proportionally resized. In this example, if a mobile device with a small display area on a display screen thereof is used to display an image in such display area, object subject matter of such an image is resized along with peripheral subject matter of such an image to fit into such display area.

SUMMARY

A method relates generally to an electronic device. In such a method, content is accessed by the electronic device to display the accessed content on at least a portion of a screen. At least one original dimension of the accessed content is determined to exceed at least one threshold dimension corresponding thereto in order to display the accessed content with the at least one original dimension on at least the portion of the screen. Responsive to a determination that the at least one original dimension exceeds the at least one threshold dimension, a subset of the accessed content is obtained with subset dimensions thereof each less than or equal to corresponding display region dimensions including the at least one threshold dimension to display the subset on at least the portion of the screen. The subset is displayed on at least the portion of the screen.

A method relates generally to display of content. In such a method, a database is queried by a programmed computing device to obtain the content for displaying on at least a portion of a screen of an electronic device. The content is cropped by the programmed computing device to select a subject thereof to provide a subset of the content. Attributes are defined by the programmed computing device for the subset. The cropped content is encoded by the programmed computing device with the attributes as metadata.

A system relates generally to an electronic device. In such a system, a memory is configured to store program code. A processor is coupled to the memory. The processor, in response to executing the program code, is configured to initiate operations for implementing displaying a subset of content on at least a portion of a screen of the electronic device. The operations include: accessing content by the electronic device to display the accessed content on at least a portion of a screen; determining at least one original dimension of the accessed content exceeds at least one threshold dimension corresponding thereto in order to display the accessed content with the at least one original dimension on at least the portion of the screen; responsive to the determining of the at least one original dimension exceeding the at least one threshold dimension, obtaining a subset of the accessed content with subset dimensions thereof each less than or equal to corresponding display region dimensions including the at least one threshold dimension to display the subset on at least the portion of the screen; and displaying the subset on at least the portion of the screen.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is block diagram depicting an exemplary portable communication device ("mobile device").

FIG. 2-1 is a picture of an exemplary image.

FIG. 2-2 is the pictorial diagram-picture of the exemplary user interface of FIG. 1-1 overlaid on the image of FIG. 2-1.

FIG. 2-3 is the pictorial diagram-picture of the exemplary user interface of FIG. 1-1 having an object subject matter subset of the image of FIG. 2-1.

FIG. 3 is a flow diagram of depicting an exemplary image handling flow for an electronic device.

FIG. 5-1 is a pictorial diagram depicting an exemplary multi-function printer ("MFP") display having a touch screen with a user interface displayed.

FIG. 5-2 is the pictorial diagram of the MFP of FIG. 5-1 with an object subject matter subset of the image of FIG. 2-1 displayed on a touch screen.

DETAILED DESCRIPTION

Figure 1:
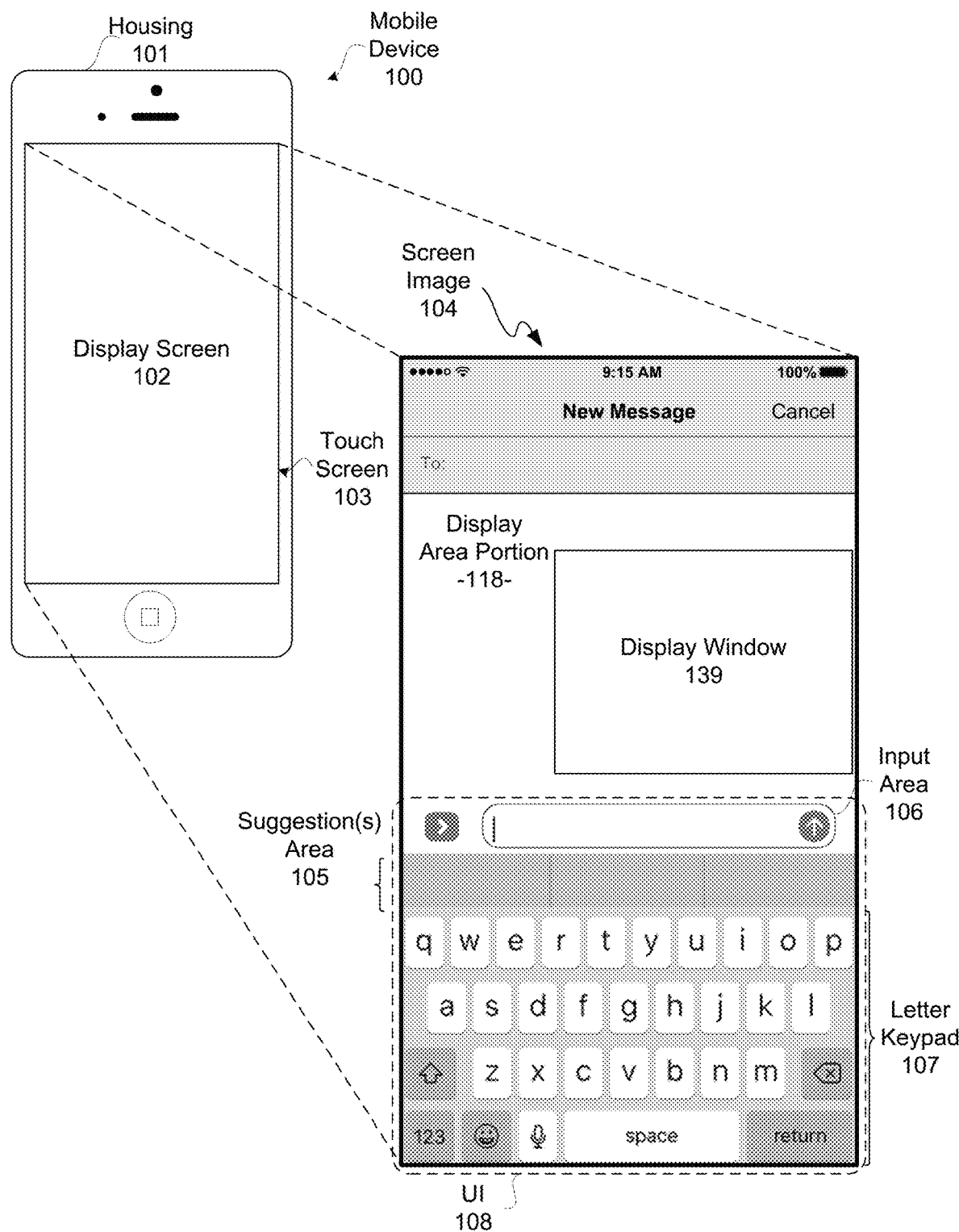
FIG. 1-1 is a pictorial diagram depicting an exemplary screen image of a display screen of a mobile device.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Before describing the examples illustratively depicted in the several figures, a general introduction is provided to further understanding.

As previously described, different screen sizes and/or resolutions can impair displaying some object subject matter in a readily discernable viewable state. Along those lines, content may be proportionally reduced to fit a display area, which may be a window covering a subset of a display screen. Such content may be scaled to fit in a region of a webpage, email message, text message, or other content handling display, to fit in a display screen. For example, object subject matter of an image texted to a mobile phone may not be readily apparent without selecting and enlarging such image. Effectively, in the past, object subject matter of such an image is resized along with peripheral subject matter, such as context and/or background, to fit into a display screen area.

To avoid having to select and enlarge an image in order to readily view object subject matter of an image, proportional resizing may be avoided by dynamically hiding or concealing a portion, such as including peripheral subject matter, of an image in favor of displaying another portion, such as including object subject matter, of such an image. By having object subject matter displayed without resizing thereof to fit a display area, object subject matter information in an image may be more readily discernable as viewed by a viewer. For example, meaning of an image may more readily be conveyed by hiding less relevant content, such as peripheral subject matter, in such image in favor of displaying more relevant content, such as object subject matter, in an original size, or at least closer to an original size than if an entirety of such an image is proportionally resized.

Along those lines, image content may be created or generated with a defined subset area thereof, which may be predefined or dynamically defined, selecting object subject matter of such image. Such object subject matter, or object subject matter subset, may be determined, which may be predetermined or dynamically determined, to be more important content in relation to peripheral subject matter content, such as context or background, of such an image. A remainder of such image, namely peripheral subject matter or a peripheral subject matter subset, having peripheral content may be dynamically hidden or concealed responsive to available display area of a display screen allotted to display of such an image.

If one or more maximum values, such as one or more maximum dimensions of a display area, are exceeded by an object subject matter subset of an image, then proportional resizing, which may include previously or dynamically determined rates, may be used to fit such object subject matter subset in such a display area. However, even an object subject matter subset scaled down from an original size, as in an overall image, is more readily viewable than such object subject matter in a proportional resizing of entire image. For example, while context of an image may be beneficial, as an image decreases in size, such context may become less meaningful to identification of object subject matter of such an image.

With the above general understanding borne in mind, various configurations for image handling for display are generally described below.

FIG. 1-1 is a pictorial diagram depicting an exemplary screen image 104 of a display screen 102 of a mobile device 100. In this example, mobile device 100 is a mobile phone; however, it will be appreciated from the following description that touch screen devices, including but not limited to mobile phones, or other electronic devices with touch screens may benefit from technology described herein.

Mobile device 100 includes a housing 101, a touch screen 103, and a display screen 102. A combination of a touch screen 103 and a display screen 102 is well-known, and thus not described herein in unnecessary detail.

Display screen 102 may be used for displaying a screen image 104 including a user interface ("UI") 108. In this example, screen image 104 is in a portrait orientation; however, a landscape orientation may likewise be used. Moreover, in this example, user interface 108 is for a mobile phone; however, in another example, user interface 108 may be a printer user interface or some other electronic device interface on a display screen 102.

Figures 1, 2:
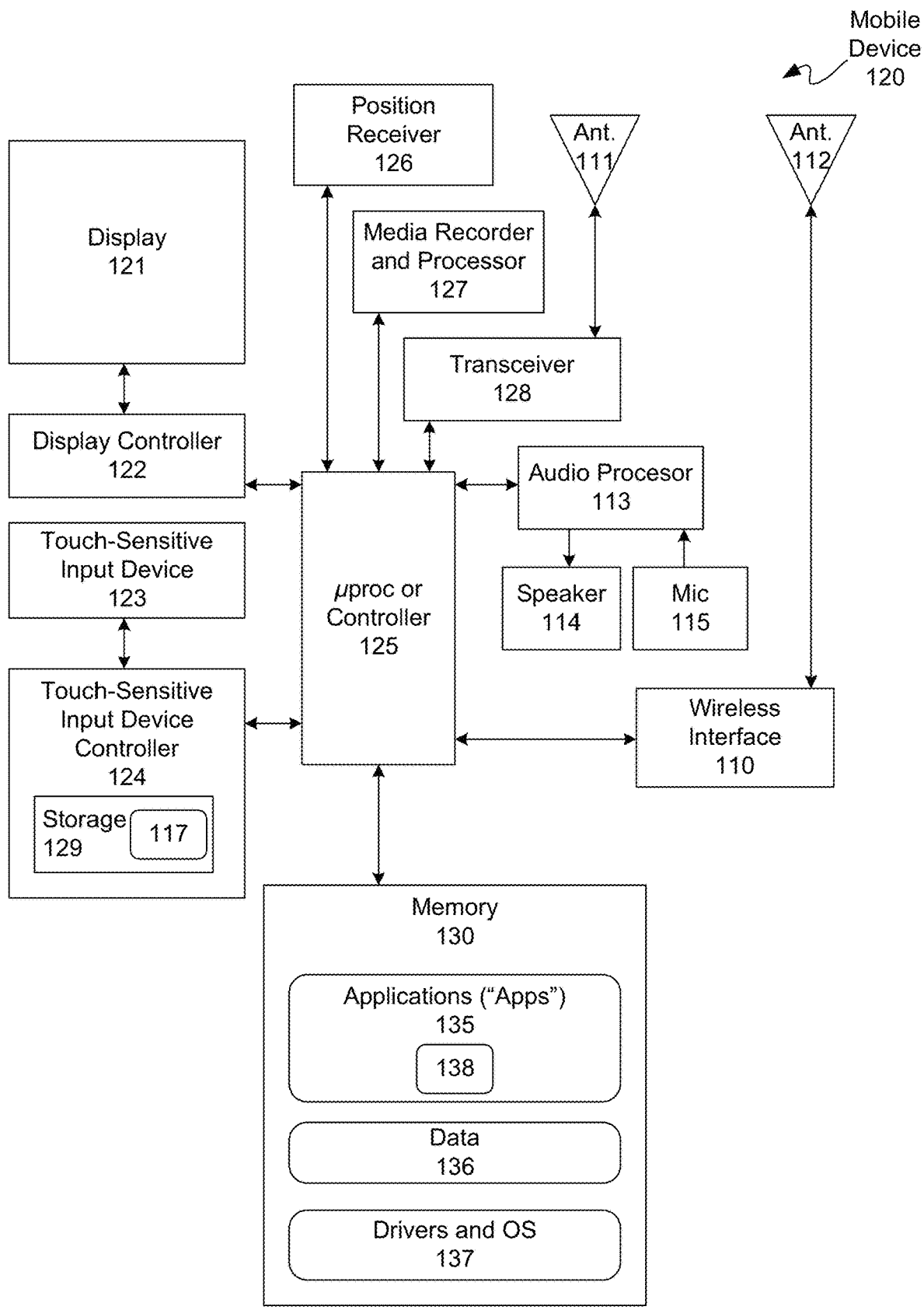

FIG. 1-2 is block diagram depicting an exemplary portable communication device ("mobile device") 120. Mobile device 120 may include a wireless interface 110, an antenna 111, an antenna 112, an audio processor 113, a speaker 114, and a microphone ("mic") 115, a display 121, a display controller 122, a touch-sensitive input device 123, a touch-sensitive input device controller 124, a microprocessor or microcontroller 125, a position receiver 126, a media recorder 127, a cell transceiver 128, and a memory or memories ("memory") 130.

Because one or more of the examples described herein may be implemented in a mobile phone, a detailed description of an example mobile phone system is provided. However, it should be understood that other configurations of touch screen devices may benefit from the technology described herein. Furthermore, while a touch screen device is described for purposes of clarity by way of example and not limitation, it should be understood that a non-touch screen device may be used in accordance with the technology described herein.

Microprocessor or microcontroller 125 may be programmed to control overall operation of mobile device 120. Microprocessor or microcontroller 125 may include a commercially available or custom microprocessor or microcontroller.

Memory 130 may be interconnected for communication with microprocessor or microcontroller 125 for storing programs and data used by mobile device 120. Memory 130 generally represents an overall hierarchy of memory devices containing software and data used to implement functions of mobile device 120.

Memory 130 may include, for example, RAM or other volatile solid-state memory, flash or other non-volatile solid-state memory, a magnetic storage medium such as a hard disk drive, a removable storage media, or other suitable storage means. In addition to handling voice communications, mobile device 120 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 130 stores drivers, such as I/O device drivers, and operating system programs ("OS") 137. Memory 130 stores application programs ("apps") 135 and data 136. Data may include application program data.

I/O device drivers stored in memory 130 may include software routines accessed through microprocessor or microcontroller 125 or by an OS 137. Apps 135 may use one or more of such drivers to communicate with devices such as the touch-sensitive input device 123 and keys and other user interface objects adaptively displayed on a display 121. For example, a driver may be used for communication from keys of a user interface displayed on display 121 associated with touch zones of touch sensitive input device 123. Moreover, drivers may be used for other actual or virtual input/output ports of mobile device 120.

Mobile device 120, such as a mobile phone or cell phone, includes a display 121. Display 121 may be operatively coupled to and controlled by a display controller 122, which may be a suitable microcontroller or microprocessor programmed with a driver for operating display 121.

Touch-sensitive input device 123 may be operatively coupled to and controlled by a touch-sensitive input device controller 124, which may be a suitable microcontroller or microprocessor. For example, touch-sensitive input device may be a haptic input device, a pressure-sensitive input device, or some other touch-sensitive input device.

Along those lines, input via touch-sensitive input device 123 may be communicated to touch-sensitive input device controller 124. Touch-sensitive input device controller 124 may optionally include local storage 129 for storing locations or touch zones or other sensed information 117 associated with touching activity input. In another example, sensed information 117 may be stored in memory 130.

Touch-sensitive input device controller 124 may be programmed with a driver or application program interface ("API") for output or display of an image in a display window 139 of display area portion 118, as described below in additional detail. Window 139 may for example be for a webpage, an email message, a text message, or another content handling display. Window 139 may be displayed or controlled by a web browser, a text message application, or an email application executed on an electronic device display in such a window.

An app 138 of apps 135 may be used to obtain a subset of an image for display in display window 139, as described below in additional detail. In another example, app 138 may be incorporated into OS 137. As described below in additional detail, app 138 is an image handling app.

In an example, touch-sensitive input device 123 is configured to facilitate touch input, namely detection of user touch of an upper surface of display 121 and touch-sensitive input device 123 in combination and recognition of user input based on locations of such touching activity. Such touching activity may be discrete touches and/or swipes, the latter of which may be used to input multiple letters without lifting a finger from an upper surface of display 121 associated with a touch-sensitive input device 123. Further, touch-sensitive input device controller 124 may be configured to provide haptic feedback features associated with such touch-sensitive input device 123. Functionality of touch-sensitive input device controller 124 may be carried out via dedicated hardware, firmware, software, or combinations thereof.

With continued reference to FIG. 1-2, microprocessor or microcontroller 125 may be programmed to interface directly via touch-sensitive input device 123 or through touch-sensitive input device controller 124. Microprocessor or microcontroller 125 may be programmed or otherwise configured to interface with one or more other interface device(s) of mobile device 120. Microprocessor or microcontroller 125 may be interconnected for interfacing with a transmitter/receiver ("transceiver") 128, audio processing circuitry, such as an audio processor 113, and a position receiver 126, such as a global positioning system ("GPS") receiver. An antenna 111 may be coupled to transceiver 128 for bi-directional communication, such as cellular and/or satellite communication.

Mobile device 120 may include a media recorder and processor 127, such as a still camera, a video camera, an audio recorder, or the like, to capture digital pictures, audio and/or video. Microprocessor or microcontroller 125 may be interconnected for interfacing with media recorder and processor 127. Image, audio and/or video files corresponding to the pictures, songs and/or videos may be stored in memory 130 as data 136.

Mobile device 120 may include an audio processor 113 for processing audio signals, such as for example audio information transmitted by and received from transceiver 128. Microprocessor or microcontroller 125 may be interconnected for interfacing with audio processor 113. Coupled to audio processor 113 may be one or more speakers 114 and one or more microphones ("mic") 115, for projecting and receiving sound, including without limitation recording sound, via mobile device 120. Audio data may be passed to audio processor 113 for playback. Audio data may include, for example, audio data from an audio file stored in memory 130 as data 136 and retrieved by microprocessor or microcontroller 125. Audio processor 113 may include buffers, decoders, amplifiers and the like.

Mobile device 120 may include one or more local wireless interfaces 110, such as a WiFi interface, an infrared transceiver, and/or an RF adapter. Wireless interface 110 may provide a Bluetooth adapter, a WLAN adapter, an Ultra-Wideband ("UWB") adapter, and/or the like. Wireless interface 110 may be interconnected to an antenna 112 for communication. As is known, a wireless interface 110 may be used with an accessory, such as for example a hands-free adapter and/or a headset. For example, audio data may be transferred from mobile device 120 to an adapter, another mobile radio terminal, a computer, or another electronic device. In another example, wireless interface 110 may be for communication within a cellular network or another Wireless Wide-Area Network ("WWAN").

Again, in this example, mobile device 120 is a mobile phone; however, it will be appreciated from the following description that touch and non-touch screen devices, including but not limited to mobile phones, printers, or other electronic devices may benefit from technology described herein. Though portable devices with touch screens are described herein, it should be understood that other electronic devices with or without touch screens and generally not intended to be portable devices may benefit from technology described herein.

As mobile device 120 of FIG. 1-2 may be an example of mobile device 100 of FIG. 1-1, for purposes of clarity by way of example and not limitation, it shall be assumed that mobile device 100 and 120 are one and the same, namely hereinafter "mobile device 100." Along those lines, mobile device 100 is further described with simultaneous reference to FIGS. 1-1 and 1-2.

A display 121 may be physically coupled to housing 101 operable to display a user interface 108 including a keypad 107. User interface 108 may include a suggestion(s) area 105, a display area portion 118 of display screen 102, and a user input area 106 in addition to keypad 107. In the example illustratively depicted, keypad 107 is a letter keypad 107 for English. However, in another example a different keypad may be used, such as a numbers keypad, a symbols keypad, a non-English letter or symbol keypad, or some other keypad. However, for purposes of clarity, it shall be assumed that an English letter keypad 107 is displayed unless otherwise indicated hereinbelow.

Touch-sensitive input device 123 may be aligned to display 121. Storage 129 may be configured to store sensed information 117 input from touch-sensitive input device 123 corresponding to keys of keypad 107 for receipt of a user input, which may be displayed in input area 106.

Microprocessor or microcontroller 125 may be programmed or otherwise configured to determine whether sensed information 117 corresponds to keys of another keypad different from English letter keypad 107. In response to a determination that sensed information 117 corresponds to keys of another keypad different from English letter keypad 107, microprocessor or microcontroller 125 may be programmed or otherwise configured to determine a corresponding input for such a user input in association with corresponding keys of such other keypad using sensed information 117.

Microprocessor or microcontroller 125 may be programmed or otherwise configured with an image handling app 138. With the above description borne in mind, examples of image handling app 138 are described below.

In order to more clearly understand operation of image handling app 138, an example of an actual picture is used. FIG. 2-1 is a picture of an exemplary image 200. In this example, image 200 is a still picture; however, in another example, image 200 may be a sequence of pictures, a frame of video, a sequence of video frames, a moving picture, or other form of image.

Image 200 in this example generally has object subject matter of a whale and peripheral subject matter of a body of water in which the whale is located. Image 200 is an actual original size of an original or source image 200. Of course, another image with same or different object and/or peripheral subject matter may be used in other examples.

In this example, object subject matter, namely a whale, may be cropped from image 200. Along those lines, a subset 201 of accessed content, namely image 200, may be determined to include all or a portion of object subject matter of image 200. Optionally, more than one subset may be cropped from an image 200, such as for example subsets 202 and 203 in this example. Different subsets may be used for different sizes of display windows 139.

In this example, all of subsets 201-203 are indexed to an upper left corner 204. Thus, a portion along a left edge 205 and an upper edge 206 is common to all of subsets 201-203. In another example, subsets 201-203 may be concentric with respect to one another, namely indexed to a center point, or some other point in an image 200. However, with each of subsets 201 through 203 there is some union of a subject matter portion, which includes a union of an object subject matter portion of each of such subsets, namely an object subject matter portion is in each one of such subsets. In this example, subject matter, including object subject matter of image 200, of a smallest subset 201 is common to all of subsets 201-203.

In this example, each of subsets 201-203 is rectangular; however, in another example another shape may be used for such subsets, such as a square or other polygon shape may be used. Furthermore, a non-rectilinear shape, such as a circle, ellipse, or other non-rectilinear shape may be used.

A subset of a plurality of subsets, such as for example subsets 201-203, of accessed content, such as image 200, may be selected for viewing, such as within a display window 139. Content of each of such subsets as in the example of subsets 201-203 may have a same aspect ratio. This aspect ratio may be the same or different from an aspect ratio of an entirety of image 200 in an original form. In this example, subsets 201-203 have a different aspect ratio than that of original or source image 200.

However, in another example, one or more of subsets 201-203 may have a different aspect ratio form one another. Along those lines, for a display region, whether of a display screen 102 or a display window 139 for example, an aspect ratio that correctly or most closely corresponds with such a display region may be selected in addition to fitting in such display region.

Furthermore, optionally each subset may have a same resolution with respect to one another. This resolution may be the same as in an original or source image 200 used to obtain subsets 201-203. This may be used to avoid a grainy appearance in a subset of an image. However, in another example, a resolution as in an original or source image 200 may be changed in a displayed subset thereof. For example, display resolution may be doubled as displayed with respect to image resolution of an original or source image 200. Moreover, a rendered subset image may be selected from multiple rendered subset images, such as lower to higher resolutions of subset images, depending on application.

In this example, going from subset 203 to subset 201, such plurality of subsets having progressively less subject matter corresponding to progressively smaller sizes of contents constituting such plurality of subsets. However, each of subsets 203-201 has a corresponding original size as in accessed content, such as original or source image 200, though for such progressively smaller amounts of content.

FIG. 2-2 is the picture of FIG. 2-1 with UI 108 of FIG. 1-1 overlaid on image 200. UI 108 may be styled to take up at least approximately an entire display area of a display screen 102. UI 108 for purposes of clarity and not limitation may be at least approximately an actual size of a UI for a mobile phone. Of course, another UI with same or different features and/or size may be used in other examples.

A display area of display screen 102 is too small to display an entirety of image 200 without scaling image 200 down. This size mismatch is exacerbated in this example by having at most a subset of such a display area, namely display area portion 118, for displaying an image 200. Furthermore, as text and or other messaging may be present in display area portion 118, only a subset of such display area portion 118 may be available for an image 200 further exacerbating such mismatch.

In the past, image 200 may have been scaled down in its entirety to fit in a display window 139 defined in display area portion 118. This scaling may for example: distort image 200, such as stretch or compact image 200, in order to fit the entirety of image 200 exactly within display window 139; or have one or more blank regions in order to fit the entirety of image 200 within display window 139 without distortion. Because of these or another shrinking of an entirety of an image, an object subject matter of such an image may not be readily ascertainable by direct viewing by a viewer without aid of magnification or enlargement.

Figures 1, 2:
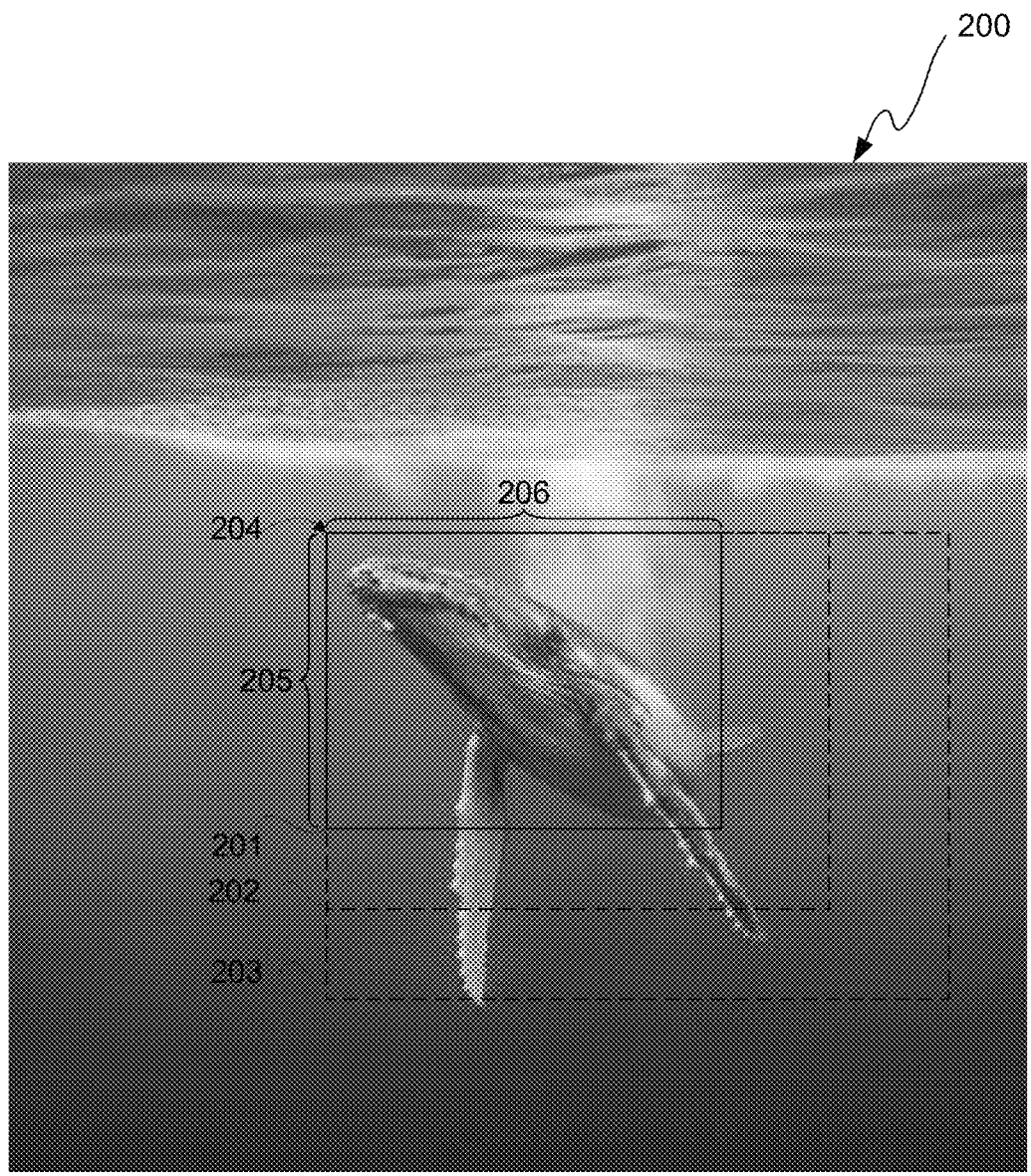
Figure 2:
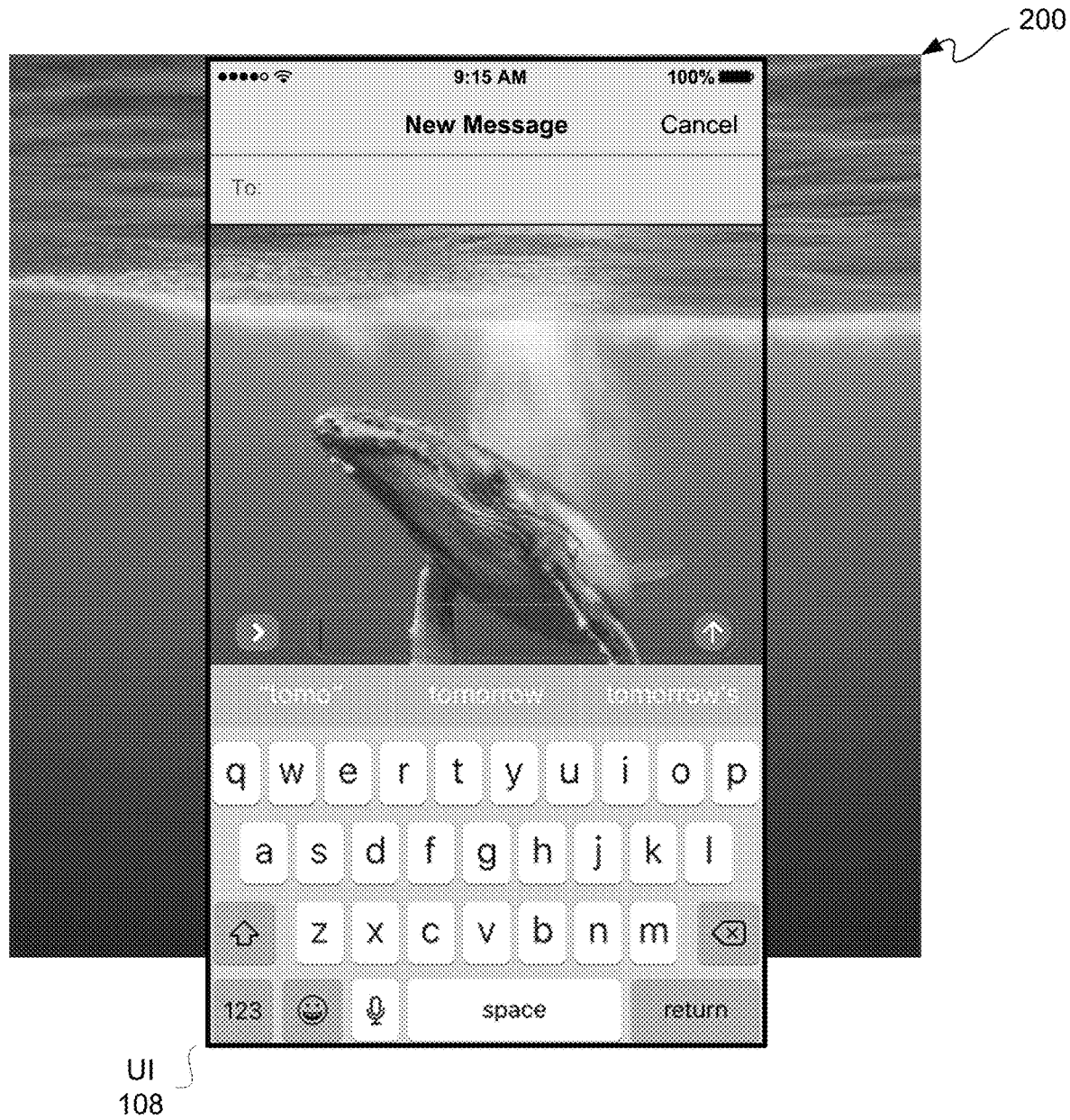
Figures 2, 3:
Figure 3:
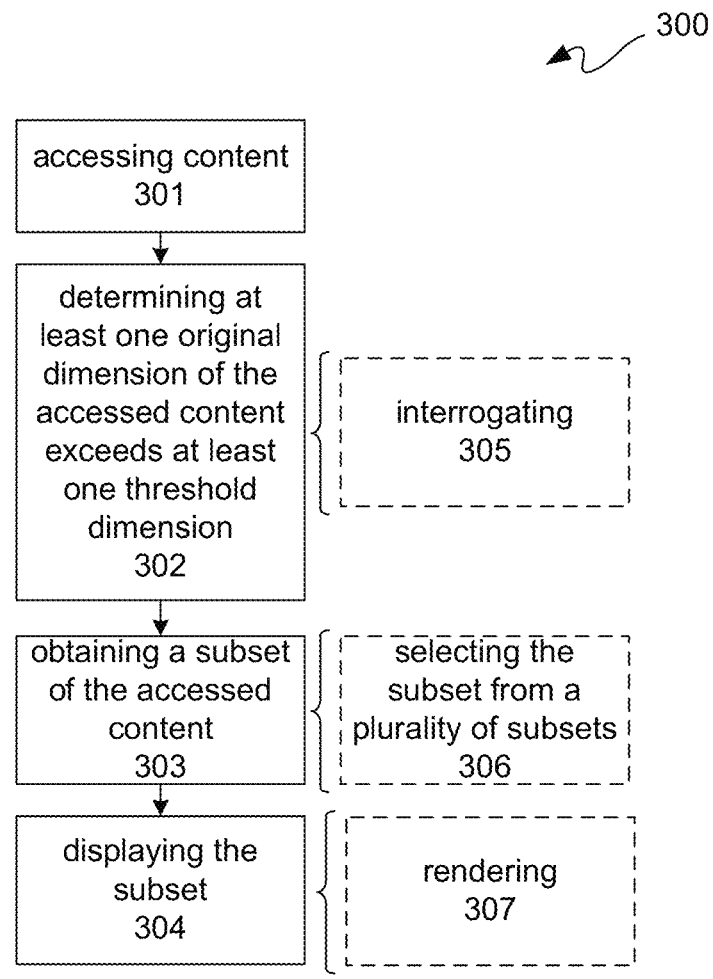

However, in this example, as depicted in FIG. 2-3, where there is shown subset 201 of FIG. 2-1 displayed in display window 139, object subject matter within subset 201 may be readily ascertainable by direct viewing by a viewer without aid of magnification or enlargement. Again, actual sizes are used for purposes of clarity and not limitation. Along those lines, subset 201 of FIG. 2-1 is slightly larger than display window 139 dimensions. If a smallest subset, such as subset 201, does not fit within a display window 139 due to one or more dimensions being larger than one or more corresponding dimensions of a display window, then subset 201 may be scaled down to fit within such display window, as is known.

However, a subset 201, or even a scaled down subset 201, has more readily viewable object subject matter than a scaled down version of the entirety of an original or source image 200. For example, if a message to be communicated by this image of a whale was to indicate it is a humpback whale and/or a humpback whale has bumps on its nose (which by the way are actually oversized hair follicles), then such message may be more easily communicated by a subset 201, even if scaled down, than a scaled down version of the entirety of a source or original image 200.

With additional reference to FIGS. 1-1 through FIG. 2-3, the flow diagram of FIG. 3 depicting an exemplary image handling flow 300 for an electronic device is further described. Again, for purposes of clarity by way of example and not limitation, it shall be assumed that image handling flow 300 is for a portable device, such as a mobile phone for example, having a display 121 and a touch-sensitive input device 123, such as previously described. However, as previously described electronic devices other than a mobile phone with a touch-sensitive input device 123 may be used.

At operation 301, content may be accessed by an electronic device for displaying such accessed content on at least a portion of a screen. Such accessed content may be an image 200.

At operation 302, it may be determined that at least one original dimension of such accessed content exceeds at least one threshold dimension corresponding thereto for displaying of such accessed content with such at least one original dimension on at least such portion of a screen. Such a portion of a screen may be a display region, such as an entirety of a display screen 102 or a display window 139. Dimensions for such display may be compared for a same orientation as between a display screen 102 or a display window and an original image or a subset image, as described below in additional detail.

For example, a height and/or a width dimension of an original or source image 200 may be larger than a corresponding height and/or width dimension of a display screen 102. In another example, a height and/or a width dimension of an original or source image 200 may be larger than a corresponding height and/or width dimension of a display window 139. In these examples, a height dimension and a width dimension of a display screen 102 or a display window 139 may be used as respective threshold dimensions.

In responsive to a determination that at least one original dimension exceeds at least one threshold dimension for display of an original image 200 on a display region, such as a display screen 102 or in a display window 139, at operation 303 a subset of such accessed content with subset dimensions thereof each less than or equal to corresponding region dimensions including such at least one threshold dimension is obtained. Such obtained subset, such as for example a subset of subsets 201 through 203 may be obtained for display of such subset on at least the portion of a screen, effectively dynamically hiding peripheral subject matter. Along those lines, if only one subset, for example subset 201, is available then such subset 201 may be obtained.

However, if there is a plurality of subsets, such as for example subsets 201-203, for accessed content, such as image 200, then optionally any one of such subsets may be selected at an optional operation 306 for obtaining a subset of accessed content at 303. For example, such a selected subset from a plurality of subsets may be selected to be the subset of such subsets that fills or most completely fills a display region, such as of a display screen 102 or display window 139 as applicable for an application, without exceeding any threshold dimension of such a display region. In an example, there may be a union between display region and subset area. Moreover, selecting a subset from any one of a plurality of subsets may be for having the largest one of the original sizes capable of most closely fitting within a window having display region dimensions.

Height and width dimensions of an image are examples of threshold dimensions. However, one or more other thresholds may be used in addition to dimensions. Such other thresholds or "break points" may, for example, include an aspect ratio. Along those lines, a subset of a plurality of subsets with a correct or most closely corresponding aspect ratio for a direct display or indirect display, such as a casting or projection, may be selected. Another break point may be a resolution, such as a minimum resolution for example.

At operation 304, subset may be displayed on at least the portion of such a screen with corresponding subset dimensions thereof to have an original size of such subset as in such accessed content, such as image 200. Again, even though an example of display of an image for a webpage, text message, or email message on a screen of a mobile phone is used, in another example displaying may be a casting, such as Airplay or chrome casting.

Figure 4:
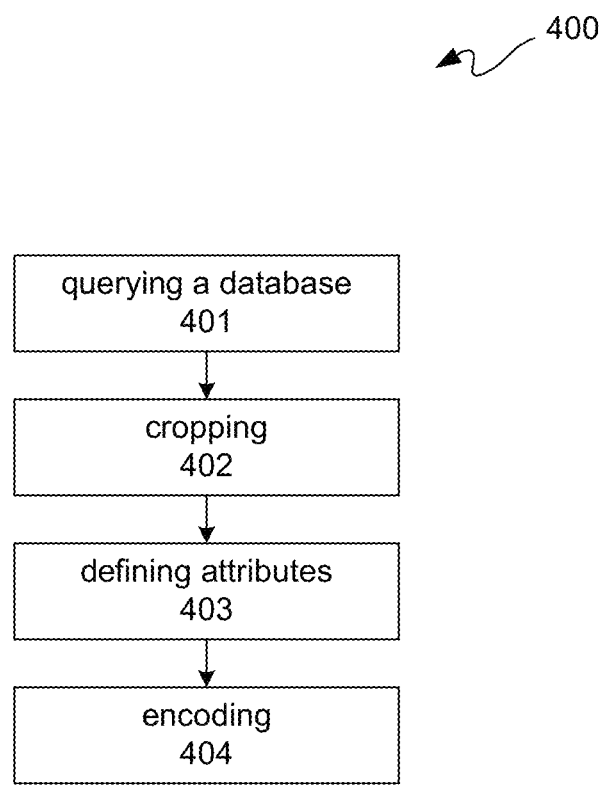
FIG. 4 is a flow diagram depicting an exemplary content encoding flow for display of content.

An image 200 may be formatted, embedded, encoded or tagged ("encoded") with one or more attributes, such as described with reference to FIG. 4, where there is shown a flow diagram depicting an exemplary content encoding flow 400 for display of content. Content encoding flow 400 is further described with additional reference to FIGS. 1-3.

At 401, a database may be queried, such as by a programmed computing device, to obtain content, such as an image 200. Such content may be obtained for displaying on at least a portion of a screen of an electronic device, such as previously described.

An example of a database may be images on or accessible via the Internet, such as for example a Google images database. A web browser programmed computing device, with one or more query terms or images, may be used to query such a database.

Responsive to obtaining image content in response to a query at 401, at 402 such image content obtained may be cropped to obtain one or more subsets thereof. For example, if an query for an image of a humpback whale returned an image 200, then such image 200 obtained may be cropped to provide one or more subsets, such as for example one or more of subsets 201-203.

Cropping at 402 may be performed by a programmed computing device. For example, a computer may obtain an image and select a display region, such as for either or both a display screen 102 or display window 139 associated with a mobile phone. Moreover, such cropping may be for different subsets for different sizes of mobile phone screens and different sizes of windows for various applications.

Such cropping may be to select a subject of such content, namely object subject matter of an image 200, to provide a subset. Moreover, there may be multiple croppings to generate multiple subsets, such as subsets 201-203, of an image. Along those lines, facial recognition, building recognition, and other types of object recognition software may be used to crop an image for object subject matter. Such image croppings may be computer generated responsive to parameters as may vary from application to application.

For the current example, convolutional filtering may be used to identify an outline of a whale, an eye of a whale, a tail of a whale, a mouth of a whale, bumps on a whale, and so on. As an eye of a whale and a mouth of a whale are generally proximate to a nose of a whale, such features may be used to have one or more croppings capture object subject matter of an image. Though the examples of a whale and a face were used, other object subject matter of an image may likewise be used.

At 403, attributes may be defined for a subset image, namely a cropped image obtained at 402. A computing device may define attributes for a subset image. Such attributes may include subset dimensions. Dimensions of a subset image may include a height attribute and a width attribute of such encoded attributes.

Such attributes may further optionally include one or more of aspect ratio or image resolution. Such attributes may yet further optionally include one or more features characterizing an image, such as a humpback whale and nose bumps.

At operation 404, such cropped content may be encoded with one or more attributes defined at 403 and such accessed content may be encoded to have available such encoded cropped content. Furthermore, such original or source accessed content may optionally be encoded with original dimensions thereof, if not already encoded in such accessed content.

Such encoding may be performed by a programmed computing device to encode cropped content, namely a subset image, with one or more attributes defined at 403 as metadata. Thus, for example, a query for an image to determine if it already exists within Google images may be performed to obtain features for a match and get attributes to define metadata. Metadata may include dimensions of a subset image, and may further include information regarding a subject of an image and/or a subject of a subset image of such an image.

Such encoded cropped content may be embedded in a source or original image 200. While one or more separate subset images may be encoded in a source or original image 200 in one example, in another example cropping locations for dynamically obtaining a subset image from a source or original image 200 may be used to reduce memory usage. In either example, an original size of a subset image may be the same as it appears in accessed content, namely a source or original image. Furthermore, in either example, a subset image may be displayed on at least a portion of a screen forming a display region with original subset dimensions thereof, unless such subset image is subsequently resized as previously described.

Returning to FIG. 3, accessed content at 301 may be an image 200 having one or more attributes indicating dimensions of such an image. Such accessed content at 301 may be a source or original image having attributes encoded therewith or therein indicating original dimensions of such a source or original image. Moreover, one or more subsets of such a source or original image, namely one or more corresponding cropped portions of such a source or original image, may have attributes encoded therewith or therein with respect to such source or original image, where such subset attributes indicate at least subset dimensions and locations for such subset images. Along those lines, optionally at operation 302, an interrogation operation at 305 may be performed. Such accessed content obtained at 301 may be interrogated at 305 to obtain subset dimensions of at least one subset as metadata provided with such accessed content.

After obtaining a subset image for display at 303, such displaying thereof at 304 may optionally include a rendering operation at 307. Such a subset image may be rendered at operation 307 for displaying within a display window 139 on a display screen 102. This rendering may be for displaying such a subset image with the original size thereof, namely as in a source or original image, or with a reduced size to fit within such display window 139. Optionally, rendering operation at 307 may be for rendering a subset image for a split screen display window 139 of display screen 102.

Figures 1, 5:
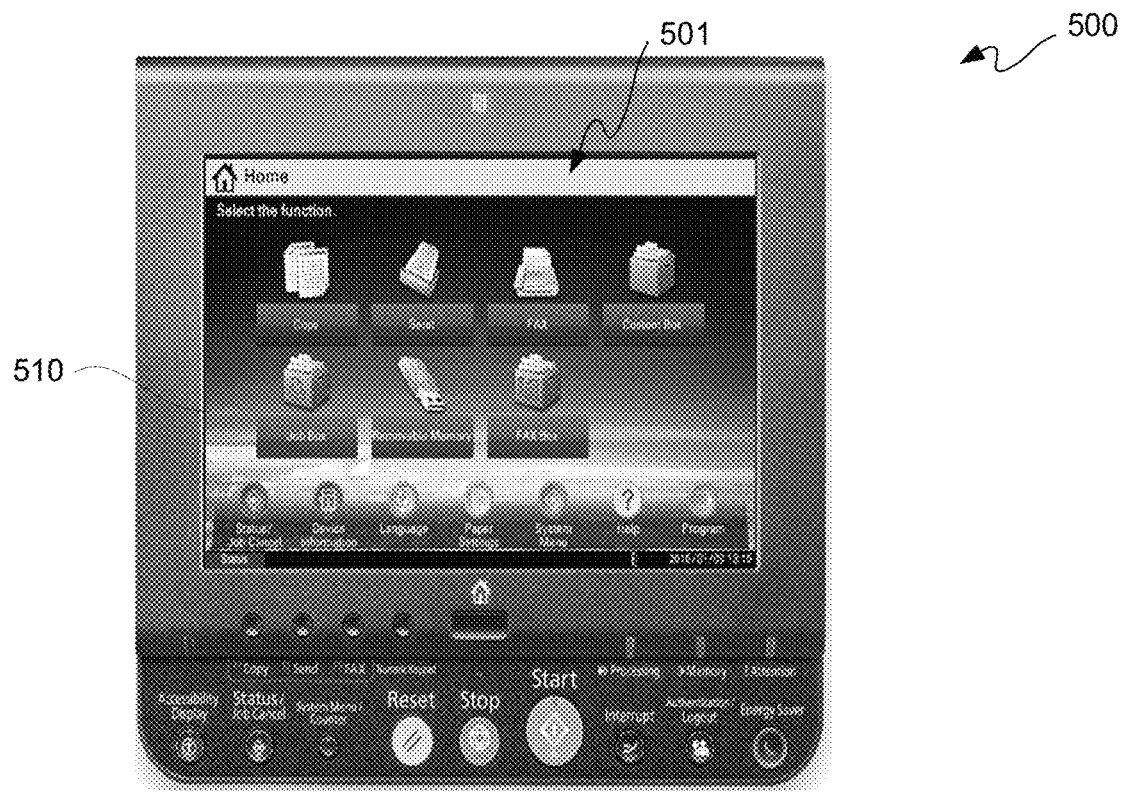
Figures 2, 5:
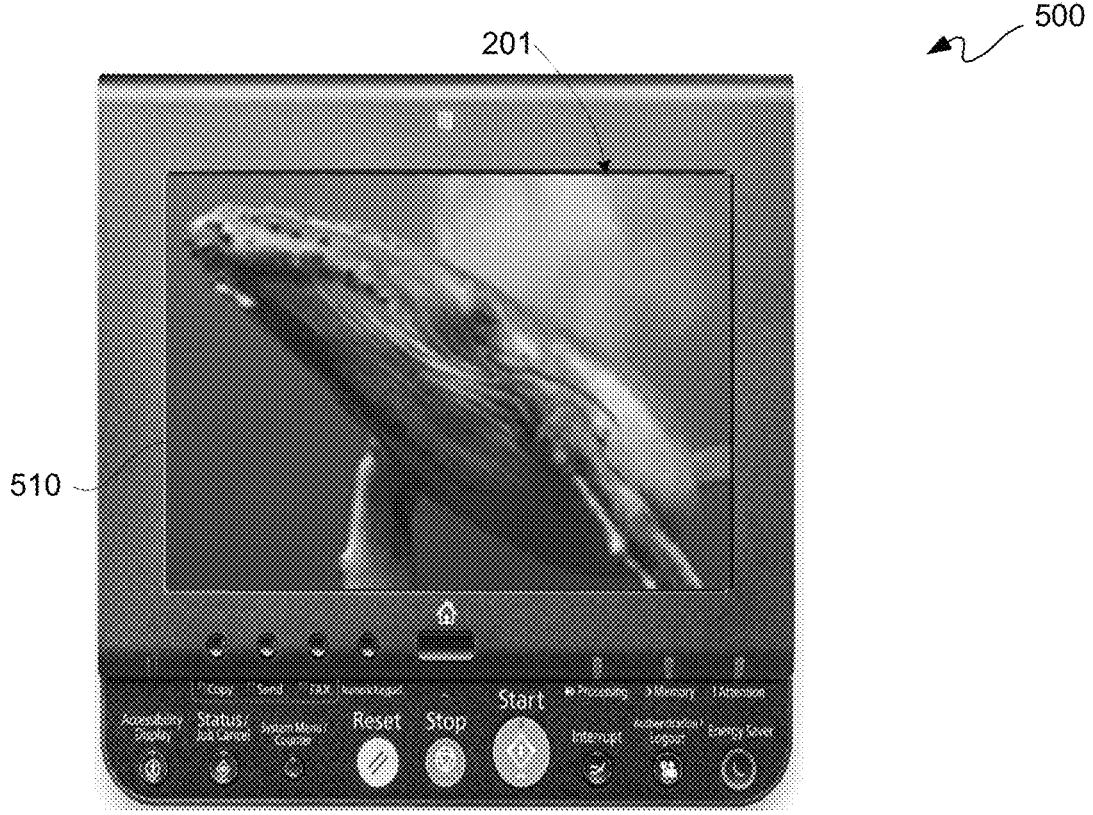

While an example of a display screen on a mobile phone has been used, a display screen on other electronic devices may likewise be used to display object subject matter, as previously described. Though a mobile phone interface was described, it should be understood that other touch screens having a keypad user interface or other user interface may benefit from technology described herein. For example, FIGS. 5-1 and 5-2 are pictorial diagrams depicting an exemplary multi-function printer ("MFP") display 500 having a touch screen 510 with user interfaces respectively displayed. FIG. 5-1 is collectively for a home user interface 501 displayed on touch screen 510 of MFP display 500. FIG. 5-2 depicts touch screen 510 of FIG. 5-1 with subset 201. In this example, subset 201 uses the entire or almost the entire area of touch screen 510; however, in another example, subset 201 may be displayed in a display window 139 on touch screen 510. This is just one example of a user interface for an MFP, and other examples may be found, for example in U.S. Pat. No. 9,578,193. Accordingly, known details regarding an MFP are not described in unnecessary detail for purposes of clarity and not limitation.

By displaying subset 201, rather than a resized entirety of an image 200 to fit touch screen 510, object subject matter such an image 200 may be more readily viewed prior to printing, copying, sending, faxing or otherwise using such image. For example, people often like to look at photos of themselves or others more closely before deciding to use such photos. By displaying subset 201 in an original size for example, people may be more readily able to determine whether to print, copy, send, fax or otherwise use the entirety of such an image 200, or even just a subset 201 thereof. Thus, a subset 201 may be selectable on touch screen 510 for printing all accessed content, such as the entirety of image 200, or just a subset 201 of image 200. In effect, a final display screen may be paper or other media in which such a subset 201 is printed in order to preserve a more important meaning in image 200. Accordingly, the term "printing" may be for paper printed, paper copied, printed to file, faxed, emailed, texted, and/or other paper and/or electronic versioning of an image 200 or a subset 201 of image 200.

Image 200 may have been already processed to be ready to be printed or edited with a bitmap graphics editor. Conventionally, for example, an image is processed by a raw converter in a wide-gamut internal color space where precise adjustments can be made before conversion to a file format, such as TIFF or JPEG for example, such as for storage, printing, and/or further processing. This processing of a raw image may encode same in a device-dependent color space.

Figure 6:
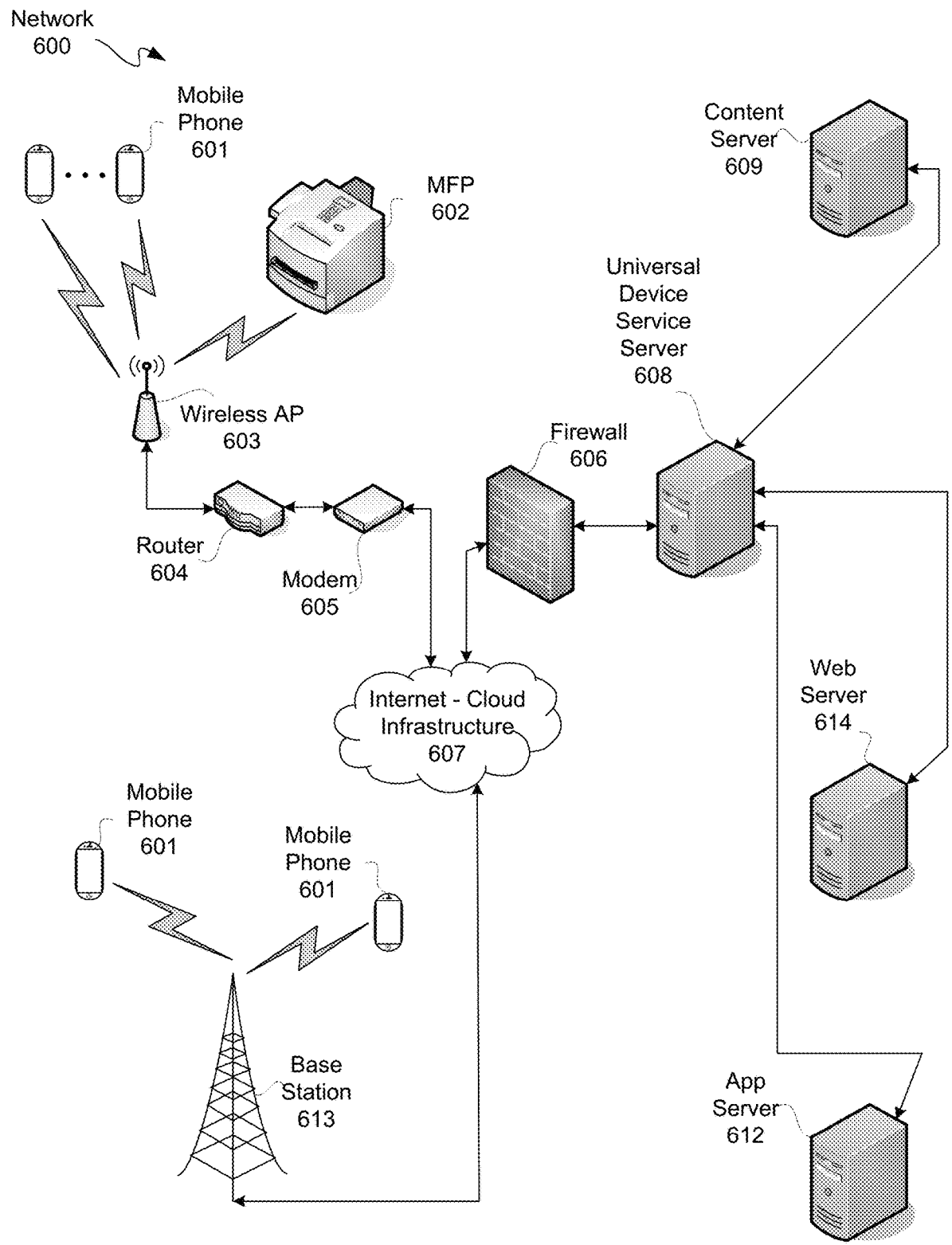
FIG. 6 is a pictorial diagram depicting an exemplary network, which may be used to download an app for the image handling flow of FIG. 3.

FIG. 6 is a pictorial diagram depicting an exemplary network 600, which may be used to download an app for image handling flow 300 as described herein. Along those lines, network 600 may include one or more mobile phones 601 in wireless communication with wireless access point ("AP") 603 and one or more mobile phones 601 in communication with a base station 613.

A MFP 602 may be in wireless communication with wireless AP 603. Wireless AP 603 may be connected for communication with a router 604, which in turn may be connected to a modem 605. Modem 605 and base station 613 may be in communication with the Internet-Cloud infrastructure 607.

A firewall 606 may be in communication with the Internet-Cloud infrastructure 607. Firewall 606 may be in communication with a universal device service server 608. Universal device service server 608 may be in communication with a content server 609, a web server 614, and/or an app server 612. App server 612, as well as a network 600, may be used for downloading an image processing app, such as for image handling flow 300 of FIG. 3 as described herein.

Figure 7:
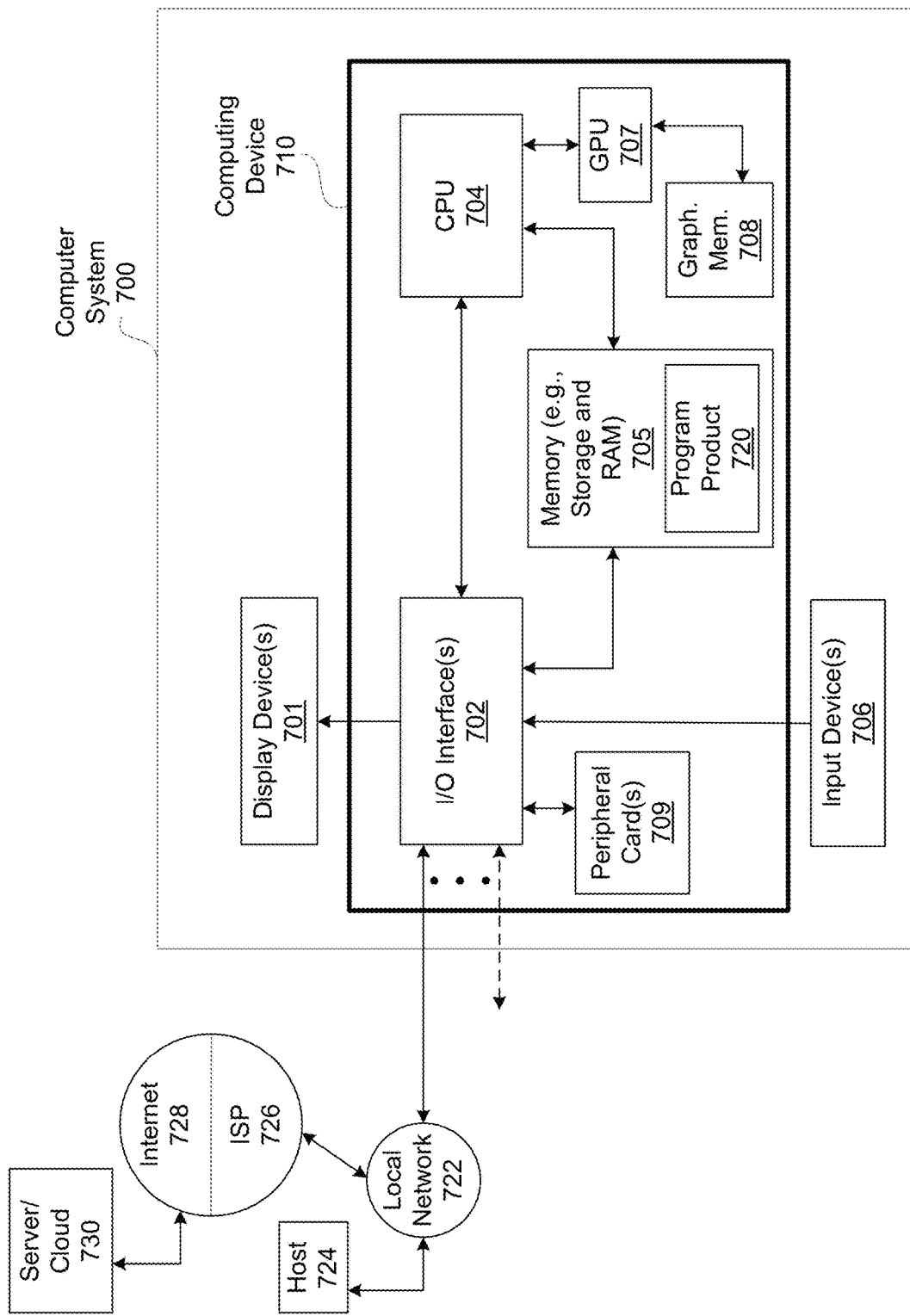
FIG. 7 is a block diagram depicting an exemplary computer system upon which one or more aspects described herein may be implemented.

In addition to a mobile phone, image handling flow 300 may be implemented in a computer system. FIG. 7 is a block diagram depicting an exemplary computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, Unix, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include a graphics processing unit ("GPU") 707 coupled to CPU 704 and one or more peripheral cards 709 coupled to I/O interface 702. Along those lines, programmed computing device 710 may include graphics memory 708 coupled to optional GPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, GPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720, such as for image handling flow 300 of FIG. 3. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for an electronic device, comprising:
   accessing content by the electronic device to display the accessed content on a portion of a screen;
   determining at least one original dimension of the accessed content exceeds at least one threshold dimension corresponding thereto in order to display the accessed content with the at least one original dimension on the portion of the screen;
   responsive to the determining of the at least one original dimension exceeding the at least one threshold dimension, obtaining a subset of the accessed content with subset dimensions thereof each less than or equal to corresponding display region dimensions including the at least one threshold dimension to display the subset on the portion of the screen;
   displaying the subset on the portion of the screen;
   wherein the accessed content is an entirety of an image stored in the electronic device having attributes indicating original dimensions of the image;
   wherein the subset is a cropped portion of the image displayed with the subset dimensions thereof being for an original size of the subset as in the accessed content with a remainder of the image as a peripheral subject matter dynamically concealed responsive to available display area of the portion of the screen allotted to display an object subject matter of the image;
   selecting the subset from a plurality of subsets of the accessed content each having a same aspect ratio and a same resolution;
   wherein the plurality of subsets have progressively less subject matter corresponding to progressively smaller sizes of contents constituting the plurality of subsets;
   wherein the accessed content includes metadata regarding the object subject matter of the subset to be displayed with different sets of metadata for each of the plurality of subsets for the dynamic concealment; and
   wherein the plurality of subsets have corresponding original sizes as in the accessed content for the progressively smaller sizes of contents.

2. The method according to claim 1, wherein the object subject matter of each of the plurality of subsets is in each of the plurality of the subsets.

3. The method according to claim 2, further comprising:
selecting the subset from the plurality of subsets having the largest one of the original sizes most closely capable of fitting within a window having the display region dimensions; and
rendering the subset for the displaying within the window on the screen.

4. The method according to claim 3, further comprising interrogating the accessed content to obtain the subset dimensions thereof from the metadata provided with the accessed content.

5. The method according to claim 1, wherein the electronic device is a mobile phone or a printer having the screen.

6. The method according to claim 1, wherein:
the electronic device is a printer having the screen;
the subset is a window cropped portion of the image displayed on the screen with the subset dimensions thereof being for an original size of the subset as in the accessed content; and
the subset displayed on the screen is selectable for printing the cropped portion of the image.

7. The method according to claim 1, wherein:
the electronic device is a printer having the screen;
the subset is a window cropped portion of the image displayed on the screen with the subset dimensions thereof being for an original size of the subset as in the accessed content; and
the subset displayed on the screen is selectable for printing the entirety of the image.

8. A method for display of content, comprising:
querying a database, by a programmed computing device, to obtain the content as an entirety of an image for storing in an electronic device and for displaying on a portion of a screen of the electronic device;
cropping, by the programmed computing device, the content to select a subject thereof to provide a plurality of subsets of the content;
defining attributes, by the programmed computing device, for each of the plurality of subsets;
encoding, by the programmed computing device, each of the plurality of subsets of the content with the attributes corresponding thereto as sets of metadata; and
wherein:
each of the sets of metadata includes dimensions of each corresponding set of the plurality of subsets and corresponding information regarding the subject;
each of the sets of metadata include an object subject matter and a peripheral subject matter for the subject with differences thereof corresponding to differences in the plurality of subsets;
the dimensions for each of the sets of metadata for the plurality of subsets is for display of a subset thereof in a window on the portion of the screen to have an original size thereof as in the content with a remainder of the content as the peripheral subject matter dynamically concealed responsive to available display area of the portion of the screen allotted to display the object subject matter of the content;
the window has at least one dimension smaller than a corresponding original dimension of the content for a same orientation; and
the subset has a same aspect ratio and a same resolution as obtained from the content.

9. The method according to claim 8, wherein the window is for a web browser, a text message or an email application executed on the electronic device for the display of the subset in the window.

10. The method according to claim 9, wherein the dimensions of the subset include a height attribute and a width attribute of the attributes.

11. The method according to claim 10, wherein the window is for a split screen region of the screen.

12. A system of an electronic device, comprising:
a memory configured to store program code; and
a processor coupled to the memory, wherein the processor, in response to executing the program code, is configured to initiate operations for implementing displaying a subset of content on a portion of a screen of the electronic device, the operations including:
accessing content by the electronic device to display the accessed content on a portion of a screen;
determining at least one original dimension of the accessed content exceeds at least one threshold dimension corresponding thereto in order to display the accessed content with the at least one original dimension on the portion of the screen;
responsive to the determining of the at least one original dimension exceeding the at least one threshold dimension, obtaining a subset of the accessed content with subset dimensions thereof each less than or equal to corresponding display region dimensions including the at least one threshold dimension to display the subset on the portion of the screen;
displaying the subset on the portion of the screen with a remainder of the accessed content as a peripheral subject matter dynamically concealed responsive to available display area of the portion of the screen allotted to display an object subject matter of the accessed content;
wherein the accessed content is an entirety of an image stored in the electronic device having attributes indicating original dimensions of the image;
wherein the subset is a cropped portion of the image displayed with the subset dimensions thereof being for an original size of the subset as in the accessed content;
wherein the accessed content includes metadata regarding the object subject matter of the subset to be displayed with different sets of metadata for each of a plurality of subsets for the dynamic concealment;
interrogating the accessed content to obtain the subset dimensions thereof as metadata provided with the accessed content;
selecting the subset from a plurality of subsets of the accessed content each having a same aspect ratio and a same resolution;
the plurality of subsets having progressively less subject matter corresponding to progressively smaller sizes of contents constituting the plurality of subsets; and
the plurality of subsets having corresponding original sizes as in the accessed content though for the progressively smaller sizes of contents.

13. The system according to claim 12, wherein the operations further comprise:
selecting the subset from any one of the plurality of subsets having the largest one of the original sizes most closely capable of fitting within a window having the region dimensions; and
rendering the subset for the displaying within the window on the screen.

* * * * *